US010422975B2

(12) United States Patent
Lo et al.

(10) Patent No.: US 10,422,975 B2
(45) Date of Patent: Sep. 24, 2019

(54) LENS MODULE

(71) Applicant: CAL-COMP BIG DATA, INC., New Taipei (TW)

(72) Inventors: Teng-Nan Lo, New Taipei (TW); Tung-Kai Tsai, New Taipei (TW)

(73) Assignee: CAL-COMP BIG DATA, INC., New Taipei (TW)

( * ) Notice: Subject to any disclaimer, the term of this patent is extended or adjusted under 35 U.S.C. 154(b) by 33 days.

(21) Appl. No.: 15/426,067

(22) Filed: Feb. 7, 2017

(65) Prior Publication Data
US 2018/0149829 A1    May 31, 2018

(30) Foreign Application Priority Data

Nov. 29, 2016 (TW) .............................. 105218246 U

(51) Int. Cl.
G03B 9/22 (2006.01)
G02B 7/24 (2006.01)
(Continued)

(52) U.S. Cl.
CPC .............. *G02B 7/24* (2013.01); *G02B 5/005* (2013.01); *G03B 9/22* (2013.01); *G03B 11/04* (2013.01); *H04N 5/2254* (2013.01)

(58) Field of Classification Search
CPC . G02B 5/005; G02B 7/24; G03B 9/10; G03B 9/12; G03B 9/14; G03B 9/18; G03B 9/22; H04N 5/2254
See application file for complete search history.

(56) References Cited

U.S. PATENT DOCUMENTS 5,923,913 A * 7/1999 O'Brien ................ G03B 9/06
                                                    396/510
6,152,614 A * 11/2000 Higuchi ................ G03B 9/22
                                                    396/501
(Continued)

FOREIGN PATENT DOCUMENTS

JP     1963004542     3/1963
JP     H08328084      12/1996
(Continued)

OTHER PUBLICATIONS

"Office Action of Korea Counterpart Application," dated May 20, 2019, p. 1-p. 12.
(Continued)

*Primary Examiner* — William R Alexander
*Assistant Examiner* — Balram T Parbadia
(74) *Attorney, Agent, or Firm* — JCIPRNET

(57) ABSTRACT

A lens module including a base, a lens, a front cover, a first shielding plate set, a second shielding plate set, and a gasket is provided. The lens is disposed on the base. The front cover is rotatably disposed above the base and the lens, and the front cover has a first through hole. Each of the first shielding plate set and the second shielding plate set is pivoted on the base. The second shielding plate set and the first shielding plate set interfere with each other. The gasket is fixed in the first through hole and coupled to the second shielding plate set. The gasket has a second through hole. When the base and the front cover rotate relative to each other, the gasket rotates with the front cover and drives the first shielding plate set and the second shielding plate set to limitedly swing.

11 Claims, 4 Drawing Sheets

(51) Int. Cl.
*G02B 5/00* (2006.01)
*H04N 5/225* (2006.01)
*G03B 11/04* (2006.01)

(56) References Cited

U.S. PATENT DOCUMENTS

| | | | | |
|---|---|---|---|---|
| 6,246,832 | B1* | 6/2001 | Terada | G02B 7/285 |
| | | | | 359/676 |
| 6,692,433 | B1* | 2/2004 | Kurosawa | G02B 5/005 |
| | | | | 600/160 |
| 2004/0027476 | A1* | 2/2004 | Masuda | H04N 5/2254 |
| | | | | 348/335 |
| 2008/0205879 | A1* | 8/2008 | Park | G03B 15/02 |
| | | | | 396/463 |
| 2008/0212958 | A1* | 9/2008 | Park | G03B 9/04 |
| | | | | 396/448 |
| 2009/0185300 | A1* | 7/2009 | Iida | G02B 7/102 |
| | | | | 359/826 |
| 2010/0014172 | A1* | 1/2010 | Koyama | G03B 7/02 |
| | | | | 359/739 |
| 2010/0027986 | A1* | 2/2010 | Katano | G03B 11/043 |
| | | | | 396/448 |
| 2010/0046102 | A1* | 2/2010 | Ho | G02B 7/14 |
| | | | | 359/828 |
| 2010/0328786 | A1* | 12/2010 | Nomura | G02B 5/005 |
| | | | | 359/701 |
| 2013/0321697 | A1* | 12/2013 | Kang | G02B 5/005 |
| | | | | 348/373 |

FOREIGN PATENT DOCUMENTS

| | | |
|---|---|---|
| JP | H10293340 | 11/1998 |
| JP | 2002148682 | 5/2002 |
| JP | 2006018019 | 1/2006 |
| JP | 2007094074 | 4/2007 |
| JP | 2015203838 | 11/2015 |
| JP | 2015232667 | 12/2015 |
| KR | 20100131778 | 12/2010 |
| KR | 20130136824 | 12/2013 |

OTHER PUBLICATIONS

"Office Action of Japan Counterpart Application," dated Jun. 4, 2019, p. 1-p. 4.

* cited by examiner

LENS MODULE

CROSS-REFERENCE TO RELATED APPLICATION

This application claims the priority benefit of Taiwan application serial no. 105218246, filed on Nov. 29, 2016. The entirety of the above-mentioned patent application is hereby incorporated by reference herein and made a part of this specification.

BACKGROUND OF THE INVENTION

Field of the Invention

The disclosure relates to a lens module, and particularly relates to a lens module having adjustable field of view.

Description of Related Art

A lens module is commonly used in a mobile phone, a notebook computer, a tablet computer, a camera, a camcorder, or a monitor in order to capture image and record video. Generally, the lens module with fixed focal length has a specific field of view. Therefore, the distance between a target object to be shot and the lens module may affect the ratio of the target object to the surrounding background (target-to-background ratio) in the field of view. To be more specific, if the target object is relatively close to the lens module, the proportion of the area occupied by the target object in the field of view will be relatively higher. If the lens module is stationary but the target object moves away from the lens module, the proportion of the area occupied by the target object in the field of view will reduce, and the proportion of the area occupied by the surrounding background in the field of view will increase.

Under such condition, the photographer needs to remove the background in an image produced after shooting by an image processing software, so as to obtain an image of the target object. However, the edges of the target object in the image obtained after the above-mentioned image post-production steps are more likely to be rough and unclear.

SUMMARY OF THE INVENTION

The disclosure provides a lens module having a fixed focal length but capable of adjusting field of view.

The disclosure proposes a lens module including a base, a lens, a front cover, a first shielding plate set, a second shielding plate set, and a gasket. The lens is disposed on the base. The front cover is rotatably disposed above the base and the lens, and the front cover has a first through hole disposed corresponding to the lens. The first shielding plate set is pivoted on the base. The second shielding plate set is pivoted on the base, the first shielding plate set is located between the base and the second shielding plate set, and the first shielding plate set and the second shielding plate set interfere with each other. The gasket is fixed in the first through hole of the front cover, the second shielding plate set is located between the gasket and the first shielding plate set, and the gasket and the second shielding plate set are coupled to each other. The gasket has a second through hole disposed corresponding to the lens, and when the base and the front cover rotate relative to each other, the gasket rotates with the front cover and drives the first shielding plate set and the second shielding plate set interfering each other to limitedly swing relative to the base, so that the first shielding plate set and the second shielding plate set move into the second through hole to cover at least a part of the lens or move away from the second through hole to expose the lens.

In one embodiment of the disclosure, the base has at least one first guiding portion, the front cover has at least one second guiding portion, the first guiding portion and the second guiding portion are coupled to each other, and the first guiding portion and the second guiding portion are located at the periphery of the lens.

In one embodiment of the disclosure, the first guiding portion is a sliding block, and the second guiding portion is a sliding slot.

In one embodiment of the disclosure, the first shielding plate set includes two first shielding plates, each of the first shielding plates has a third guiding portion. The second shielding plate set includes two second shielding plates, each of the second shielding plates has a fourth guiding portion. The first shielding plates and the second shielding plates are disposed in pairs, and each of the first shielding plates and the corresponding second shielding plate are coupled to each other through the corresponding third guiding portion and fourth guiding portion.

In one embodiment of the disclosure, each of the third guiding portions is a sliding pin, and each of the fourth guiding portions is a sliding slot.

In one embodiment of the disclosure, each of the second shielding plates has a fifth guiding portion, the gasket has two sixth guiding portions. The two fifth guiding portions are respectively and mutually coupled to the two sixth guiding portions. Each of the fifth guiding portions and the corresponding fourth guiding portion are located at two opposite sides of the corresponding second shielding plate.

In one embodiment of the disclosure, each of the fifth guiding portions is a sliding pin, and each of the sixth guiding portions is a sliding slot.

In one embodiment of the disclosure, each of the first shielding plates has a first companion side edge, and each of the second shielding plates has a second companion side edge. When the base and the front cover rotate relative to each other, the gasket rotates with the front cover and drives each of the second shielding plates to limitedly swing relative to the base, and each of the first shielding plates is driven by the corresponding second shielding plate to limitedly swing relative to the base, and after the two first companion side edges are bonded with each other and the two second companion side edges are bonded with each other, the first shielding plate set and the second shielding plate set cover the lens.

In one embodiment of the disclosure, the two first shielding plates and the two second shielding plates are pivotally connected to two pairs of opposite corners of the base, respectively.

In one embodiment of the disclosure, the gasket further has at least one slot, and the front cover further has at least one hook, the slot and the hook are engaged with each other.

In one embodiment of the disclosure, the front cover has at least one supporting portion configured to support the gasket, so that the gasket and the base define a space to accommodate the first shielding plate set and the second shielding plate set.

Based on the above, in the lens module with fixed focal length of the disclosure, the first shielding plate set and the second shielding plate set disposed above the lens are manually controlled to move, so as to adjust the field of view of the lens module.

In order to make the aforementioned and other features and advantages of the disclosure comprehensible, several exemplary embodiments accompanied with figures are described in detail below.

DESCRIPTION OF THE EMBODIMENTS

Figure 1:
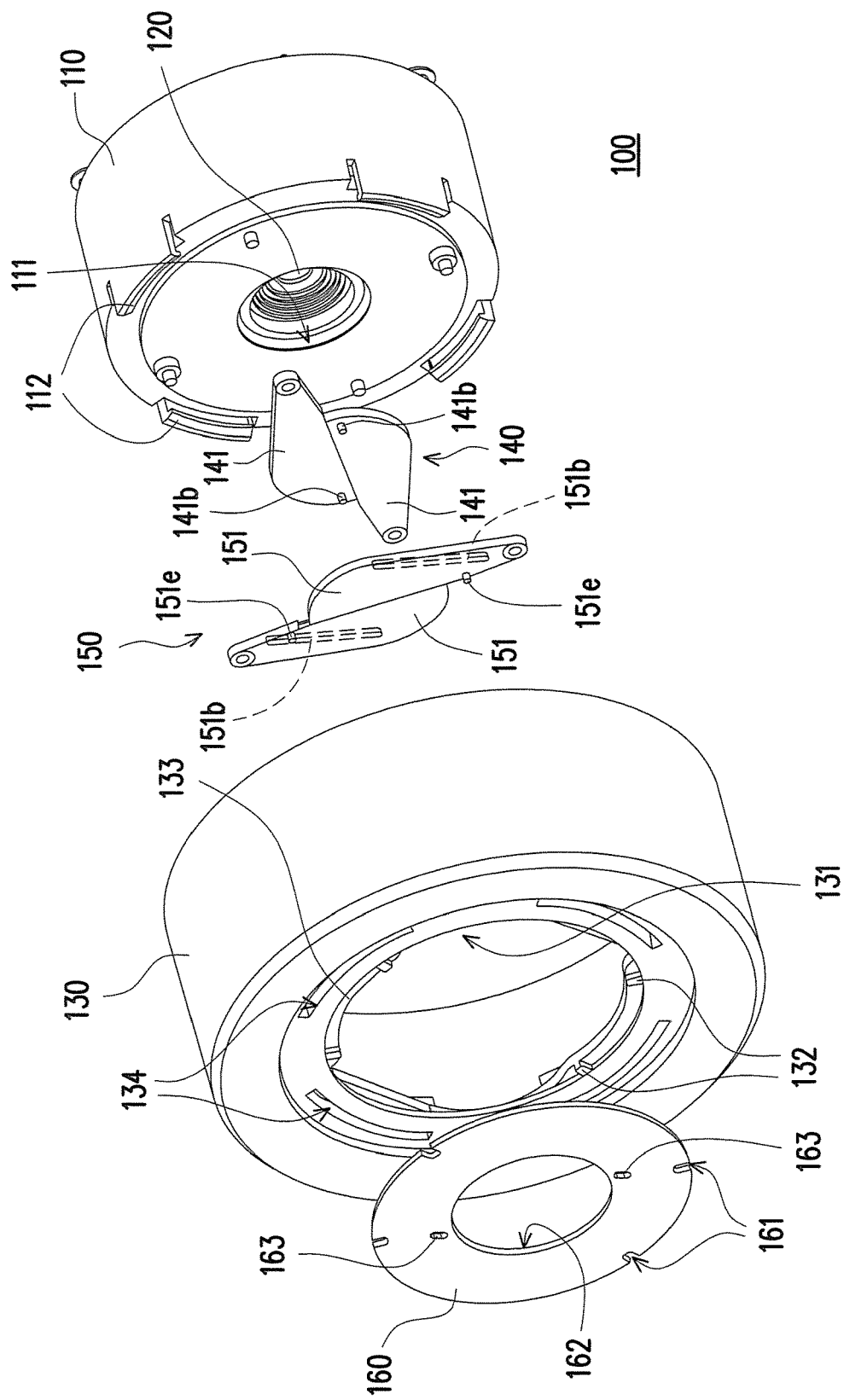
FIG. 1 is an exploded schematic view of a lens module according to one embodiment of the disclosure.
Figure 2:
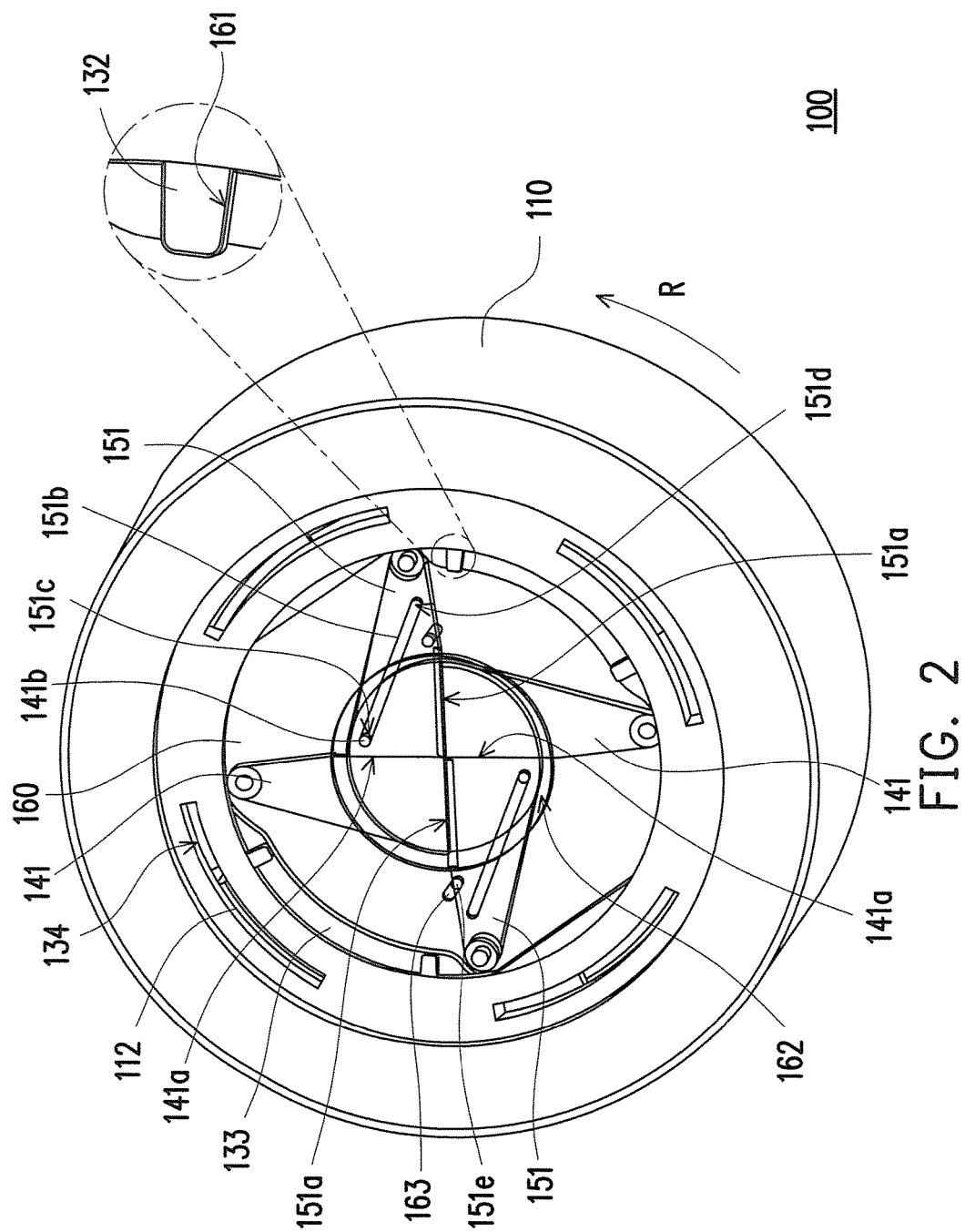
FIG. 2 is an assembly schematic view of the lens module in FIG. 1 at a first state.

FIG. 1 is an exploded schematic view of a lens module according to one embodiment of the disclosure. FIG. 2 is an assembly schematic view of the lens module in FIG. 1 at a first state. For clarity and ease of explanation, a second shielding plate set 150 and a gasket 160 are depicted as transparent in FIG. 2, wherein the first state shown in FIG. 2 may be called as fully-closed state. Referring to FIGS. 1-2, in the present embodiment, a lens module 100 is applicable to a mobile phone, a notebook computer, a tablet computer, a camera, a camcorder, or a monitor. For example, the lens module 100 may be electrically coupled to a control unit (not shown), and the control unit (not shown) may be electrically coupled to a wireless (or wired) transmitting unit (not shown). Therefore, the user can remotely send a signal to the wireless (or wired) transmitting unit (not shown), and the wireless (or wired) transmitting unit (not shown) transmits the received signal to the control unit (not shown). At this time, the control unit (not shown) controls the lens module 100 to capture image and to record video according to the signal. In other embodiments, the lens module may be combined with a body (not shown), corresponding physical or virtual buttons are provided on the body (not shown), the user can press or touch the physical or virtual buttons to control the lens module to capture image and to record video. The methods to control the lens module to capture image and to record video in the disclosure is not limited.

The lens module 100 includes a base 110, a lens 120, a front cover 130, a first shielding plate set 140, a second shielding plate set 150, and a gasket 160. In addition, the lens 120 is disposed on the base 110 and is embedded into the base 110. The base 110 has a window area 111 configured to expose at least a part of the lens 120. The front cover 130 is rotatably disposed above the base 110 and the lens 120, and the front cover 130 has a first through hole 131 disposed corresponding to the lens 120. To be more specific, the first through hole 131 is located right above the lens 120 and aligned with the window area 111 and the lens 120.

Each of the first shielding plate set 140 and the second shielding plate set 150 is pivoted on the base 110, and the first shielding plate set 140 is located between the base 110 and the second shielding plate set 150. More specifically, the first shielding plate set 140 and the second shielding plate set 150 interfere with each other, the first shielding plate set 140 includes two first shielding plates 141, the second shielding plate set 150 includes two second shielding plates 151, and the two first shielding plates 141 and the two second shielding plates 151 are pivotally connected to two pairs of opposite corners of the base 110, respectively. The first shielding plates 141 and the second shielding plates 151 are disposed in pairs, and the pairs of the first shielding plate 141 and the second shielding plate 151 interfere each other. The gasket 160 is fixed in the first through hole 131 of the front cover 130, the second shielding plate set 150 is located between the gasket 160 and the first shielding plate set 140, and the gasket 160 and each of the second shielding plates 151 are coupled to each other. For example, the gasket 160 may have at least one slot 161, and the front cover 130 may have at least one hook 132 which is a protrusion disposed inside the first through hole 131, and the slot 161 and the hook 132 are engaged with each other in order to fix the gasket 160 into the first through hole 131 of the front cover 130. In another embodiment, the positions of the slot and the hook may be interchanged. For example, the hook may be disposed on the gasket and the slot may be disposed inside the first through hole of the front cover.

In the present embodiment, the gasket 160 has a second through hole 162 disposed corresponding to the lens 120, the second through hole 162 is disposed right above the lens 120 and aligned with the first through hole 131, the lens 120, and the window area 111. On the other hand, the front cover 130 has at least one supporting portion 133 configured to support the gasket 160, so that a gap between the gasket 160 and the base 110 is maintained to define a space in order to accommodate the first shielding plate set 140 and the second shielding plate set 150. FIG. 2 illustrates a first state (fully-closed state) representing that the lens 120 is covered by the first shielding plate set 140 and the second shielding plate set 150, each of the first shielding plates 141 has a first companion side edge 141a, and each of the second shielding plates 151 has a second companion side edge 151a. In the first state (fully-closed state) of FIG. 2, the two first companion side edges 141a are bonded with each other and the two second companion side edges 151a are bonded with each other, so that the lens 120 is covered by the first shielding plate set 140 and the second shielding plate set 150.

Figure 3:
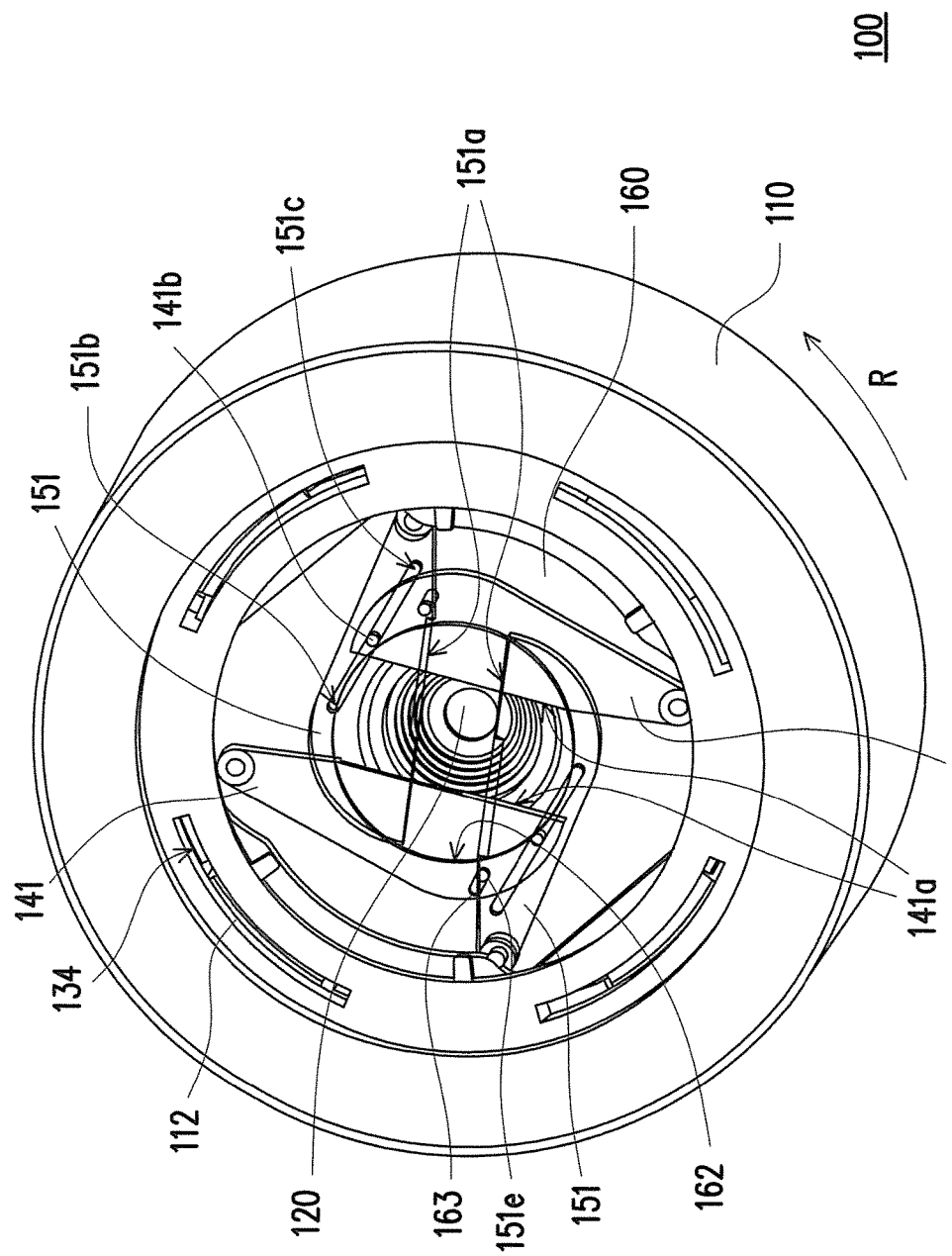
FIG. 3 is a schematic view of the lens module in FIG. 2 transforming from the first state to a second state.
Figure 4:
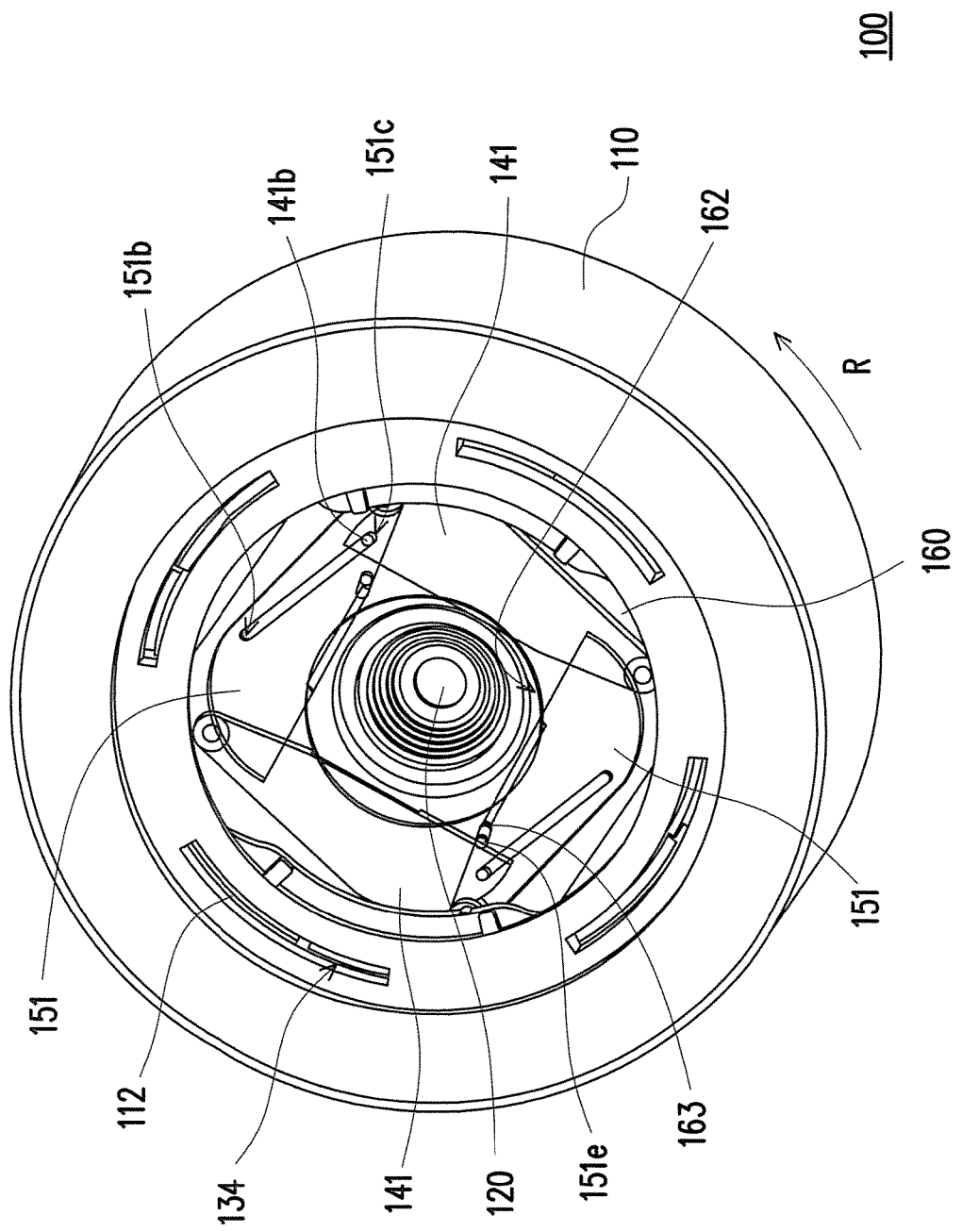
FIG. 4 is a schematic view of the lens module in FIG. 3 transforming from the second state to a third state.

FIG. 3 is a schematic view of the lens module in FIG. 2 transforming from the first state to a second state. FIG. 4 is a schematic view of the lens module in FIG. 3 transforming from the second state to a third state. For clarity and ease of explanation, the gasket 160 and the second shielding plate set 150 are depicted as transparent in FIGS. 3-4, wherein the second state shown in FIG. 3 may be called as half-opened state, and the third state shown in FIG. 4 may be called as fully-opened state. Referring to FIGS. 2-4, in the present embodiment, when the front cover 130 and the base 110 rotate relative to each other, the gasket 160 rotates with the front cover 130 and drives the second shielding plate set 150 to limitedly swing relative to the base 110, and the first shielding plate set 140 is driven by the second shielding plate set 150 to limitedly swing relative to the base 110, so that the first shielding plate set 140 and the second shielding plate set 150 move into the second through hole 162 to cover at least a part of the lens 120 or move away from the second through hole 162 to expose the lens 120.

In detail, the base 110 has at least one first guiding portion 112, and the front cover 130 has at least one second guiding portion 134. The first guiding portion 112 may be an arc-shaped sliding block, the second guiding portion 134 may be an arc-shaped sliding slot, the first guiding portion 112 and the second guiding portion 134 are coupled to each other (i.e., the arc-shaped sliding block is slidably disposed in the arc-shaped sliding slot), and the first guiding portion 112 and the second guiding portion 134 are located at the periphery of the lens 120. Because of the guidance of the first guiding portion 112 and the second guiding portion 134, the base 110 and the front cover 130 are capable of rotating relative to each other. In another embodiment, the positions of the arc-shaped sliding block and the arc-shaped sliding slot may be interchanged. For example, the arc-shaped sliding slot may be disposed on the base and the arc-shaped sliding block may be disposed inside the front cover.

On the other hand, the two first shielding plates 141 and the two second shielding plates 151 are pivotally connected to two pairs of opposite corners of the base 110, respectively. Thus, the two first shielding plates 141 and the two second shielding plates 151 limitedly swing relative to the base 110 and about four parallel and different axes, respectively. In other words, the two first shielding plates 141 and the two second shielding plates 151 are eccentrically disposed on the base 110. Each of the first shielding plates 141 has a third guiding portion 141b, each of the second shielding plates 151 has a fourth guiding portion 151b, and the first shielding plate 141 and the second shielding plate 151 in a pair are coupled to each other through the corresponding third guiding portion 141b and fourth guiding portion 151b. In the present embodiment, each of the third guiding portions 141b is a sliding pin, each of the fourth guiding portions 151b is a sliding slot, each of the sling pins is slidably disposed in the corresponding straight sliding slot, and the straight sliding slot has a closing dead point 151c and an expanding dead point 151d corresponding to the closing dead point 151c. In the first state (fully-closed state), each of the third guiding portions 141b is located at the closing dead point 151c of the corresponding fourth guiding portion 151b.

Each of the second shielding plates 151 has a fifth guiding portion 151e, and each of the fifth guiding portions 151e and the corresponding fourth guiding portion 151b are located at two opposite sides of the corresponding second shielding plate 151. The gasket 160 has two sixth guiding portions 163, the two fifth guiding portions 151e are respectively and mutually coupled to the two sixth guiding portions 163, each of the fifth guiding portions 151e is a sliding pin, and each of the sixth guiding portions 163 is a sliding slot, and each of the sliding pins is slidably disposed in the corresponding slot. In other embodiments, the fifth guiding portion may be a sliding slot, and the sixth guiding portion may be a sliding pin.

When the user manually rotates the base 110 and the front cover 130 relative to each other (i.e., the base 110 rotates relative to the front cover 130 along a rotating direction R), each of the second guiding portions 134 slides along the rotating direction R and relative to the corresponding first guiding portion 112, so that the gasket 160 rotates with the front cover 130. At this time, the two fifth guiding portions 151e are respectively guided by the two sixth guiding portions 163 so that the two second shielding plates 151 limitedly swing relative to the base 110 and along different swing directions, respectively. The two third guiding portions 141b are respectively guided by the two fourth guiding portions 151b, so that the two first shielding plates 141 limitedly swing relative to the base 110 and along different swing directions, respectively. After the two second shielding plates 151 and the two first shielding plates 141 limitedly swing relative to the base 110 and along different and respective swing directions, each of the third guiding portions 141b is distant from the closing dead point 151c of the corresponding fourth guiding portion 151b, the two first companion side edges 141a are separated from each other, and the two second companion side edges 151a are also separated from each other. Therefore, the lens module 100 transforms from the first state (fully-closed state) to the second state (half-opened state), so that a part of the lens 120 is covered by the first shielding plate set 140 and the second shielding plate set 150. It should be noted here, since the two first shielding plates 141 and the two second shielding plates 151 respectively have a pivot end and a movable end corresponding to the pivot end, when the base 110 and the front cover 130 rotate relative to each other, the two first shielding plates 141 and the two second shielding plates 151 respectively and limitedly swing because of the two fifth guiding portions 151e guided by the two sixth guiding portions 163 and the two third guiding portions 141b guided by the two fourth guiding portions 151b.

When the base 110 continues to rotate relative to the front cover 130 and along the rotating direction R, because of the two fifth guiding portions 151e guided by the two sixth guiding portions 163 and the two third guiding portions 141b guided by the two fourth guiding portions 151b, the two first shielding plates 141 and the two second shielding plates 151 move away from the second through hole 162 to expose the lens 120, FIG. 4 shows the third state (fully-opened state). At this time, each of the third guiding portions 141b is located at the expanding dead point 151d of the corresponding fourth guiding portion 151b. To be more specific, the degree that the lens 120 is covered by the first shielding plate set 140 and the second shielding plate set 150 can be adjusted between the first state (fully-closed state) shown in FIG. 2, the second state (half-opened state) shown in FIG. 3, and the third state (fully-opened state) shown in FIG. 4. Therefore, the degree that the lens 120 is covered by the first shielding plate set 140 and the second shielding plate set 150 can be controlled even though the lens 120 has fixed focal length, so that the field of view of the lens module 100 can be adjusted. For example, if the distance between the target object and the lens module 100 is fixed, by adjusting the degree that the lens 120 is covered by the first shielding plate set 140 and the second shielding plate set 150, the proportion of the area occupied by the target object in the field of view will increase in order to achieve the effect of removing the surrounding background of the target object.

It should be noted here, if the user makes the first shielding plate set 140 and the second shielding plate set 150 to cover the lens 120 completely, only making the base 110 to rotate relative to the front cover 130 in a reverse direction of the rotating direction R will be needed to return the lens module 100 to the first state (fully-closed state) shown in FIG. 2.

In summary, the lens module having fixed focal length in the disclosure may be controlled by hand to rotate the front cover and the base relative to each other, so as to drive the first shielding plate set and the second shielding plate set to limitedly swing relative to base, and the degree that the lens is covered by the first shielding plate set and the second shielding plate set is controlled to adjust the field of view of the lens module. For example, if the distance between the target object and the lens module is fixed, by adjusting the degree that the lens is covered by the first shielding plate set and the second shielding plate set, the proportion of the area occupied by the target object in the field of view will increase in order to achieve the effect of removing the surrounding background of the target object.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A lens module, comprising:
    a base;
    a lens, disposed on and embedded into the base;
    a front cover, rotatably disposed above the base and the lens, and the front cover having a first through hole disposed corresponding to the lens;
    a first shielding plate set, pivoted on the base and directly contacting the base;
    a second shielding plate set, pivoted on the base and directly contacting the base, wherein the first shielding plate set is located between the base and the second shielding plate set, and the first shielding plate set and the second shielding plate set interfere with each other; and
    a gasket, fixed in the first through hole of the front cover, wherein the second shielding plate set is located between the gasket and the first shielding plate set, the gasket and the second shielding plate set are coupled to each other, and the gasket has a second through hole disposed corresponding to the lens, and wherein when the base and the front cover rotate relative to each other, the gasket rotates with the front cover and drives the first shielding plate set and the second shielding plate set interfering each other to limitedly swing relative to the base so that the first shielding plate set and the second shielding plate set move into the second through hole to cover at least a part of the lens or move away from the second through hole to expose the lens.

2. The lens module as recited in claim 1, wherein the base has at least one first guiding portion, the front cover has at least one second guiding portion, the first guiding portion and the second guiding portion are coupled to each other, and the first guiding portion and the second guiding portion are located at a periphery of the lens.

3. The lens module as recited in claim 2, wherein the first guiding portion is a sliding block, and the second guiding portion is a sliding slot.

4. The lens module as recited in claim 1, wherein the first shielding plate set comprises two first shielding plates, each of the first shielding plates has a third guiding portion, the second shielding plate set comprises two second shielding plates, each of the second shielding plates has a fourth guiding portion, the first shielding plates and the second shielding plates are disposed in pairs, and each of the first shielding plates and the corresponding second shielding plate are coupled to each other through the corresponding third guiding portion and fourth guiding portion.

5. The lens module as recited in claim 4, wherein each of the third guiding portions is a sliding pin, and each of the fourth guiding portions is a sliding slot.

6. The lens module as recited in claim 4, wherein each of the second shielding plates has a fifth guiding portion, the gasket has two sixth guiding portions, the two fifth guiding portions are respectively and mutually coupled to the two sixth guiding portions, each of the fifth guiding portions and the corresponding fourth guiding portion are located at two opposite sides of the corresponding second shielding plate.

7. The lens module as recited in claim 6, wherein each of the fifth guiding portions is a sliding pin, and each of the sixth guiding portions is a sliding slot.

8. The lens module as recited in claim 4, wherein each of the first shielding plates has a first companion side edge, and each of the second shielding plates has a second companion side edge, when the base and the front cover rotate relative to each other, the gasket rotates with the front cover and drives each of the second shielding plates to limitedly swing relative to the base, and each of the first shielding plates is driven by the corresponding second shielding plate to limitedly swing relative to the base, after the two first companion side edges are bonded with each other and the two second companion side edges are bonded with each other, the first shielding plate set and the second shielding plate set cover the lens.

9. The lens module as recited in claim 4, wherein the two first shielding plates and the two second shielding plates are pivotally connected to two pairs of opposite corners of the base, respectively.

10. The lens module as recited in claim 1, wherein the gasket further has at least one slot, and the front cover further has at least one hook, the slot and the hook are engaged with each other.

11. The lens module as recited in claim 1, wherein the front cover has at least one supporting portion configured to support the gasket, so that the gasket and the base define a space to accommodate the first shielding plate set and the second shielding plate set.

* * * * *